UNITED STATES PATENT OFFICE.

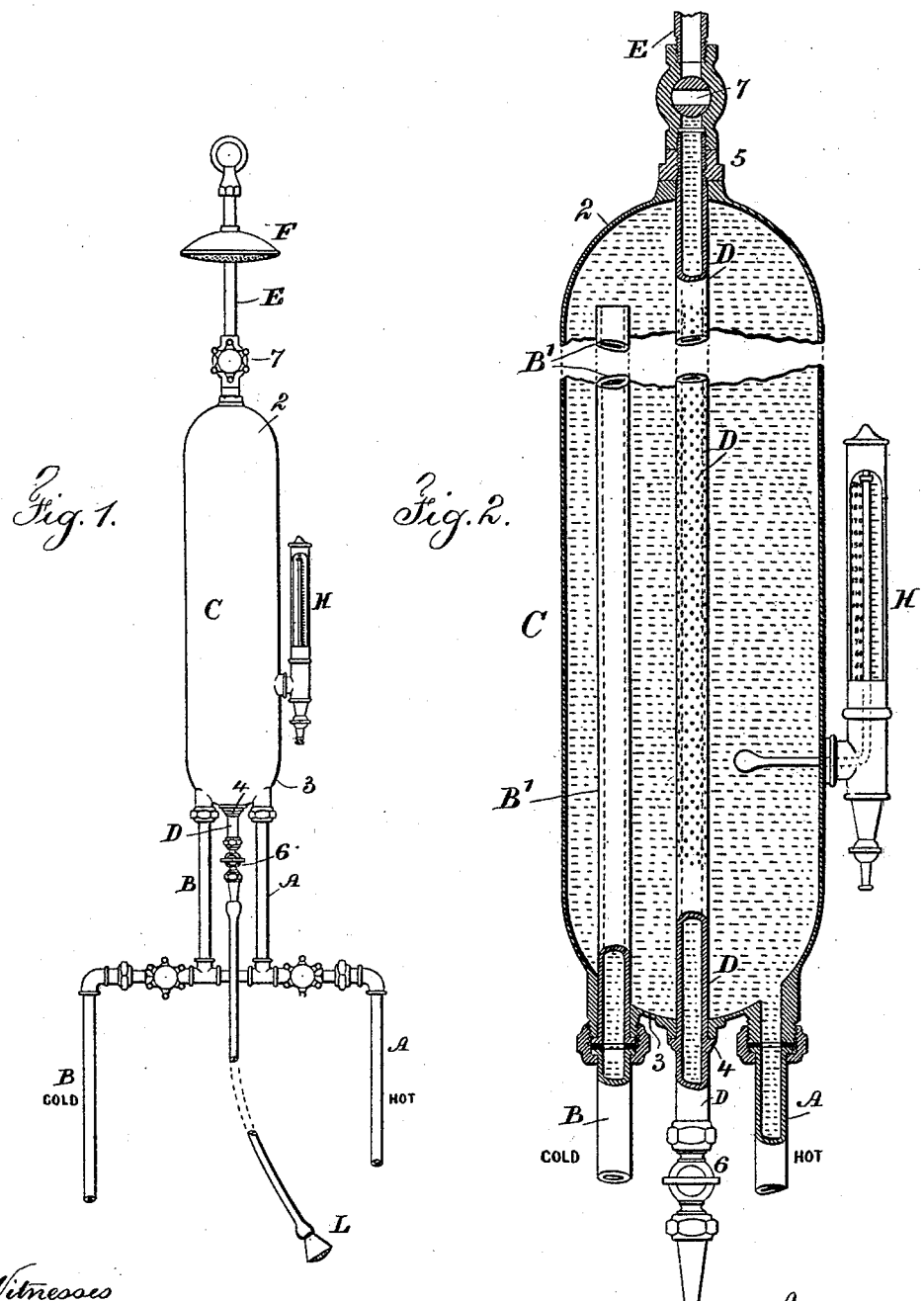

LOUIS M. HOOPER, OF RUTHERFORD, NEW JERSEY, ASSIGNOR TO THE J. L. MOTT IRON WORKS, OF NEW YORK, N. Y.

MIXING VESSEL FOR BATHS, BASINS, &c.

SPECIFICATION forming part of Letters Patent No. 584,265, dated June 8, 1897.

Application filed October 24, 1895. Serial No. 566,715. (No model.)

*To all whom it may concern:*

Be it known that I, LOUIS M. HOOPER, a citizen of the United States, residing at Rutherford, in the county of Bergen and State of New Jersey, have invented an Improvement in Mixing Vessels for Baths, Basins, &c., of which the following is a specification.

Difficulty has heretofore been experienced in mixing hot and cold water together in such a manner that they are delivered with uniformity through a shower, bidet, or douche directly upon the person. In the pipes or vessels that have heretofore been employed for this purpose there is a risk of water passing out unduly heated and other water following that is too unduly cold.

The object of the present invention is to avoid these difficulties and to insure a uniformity in the temperature of the water as delivered from the mixing vessel.

In the drawings, Figure 1 is an elevation of the mixing vessel and its connections, and Fig. 2 is a vertical section of the same on a larger scale.

The mixing vessel C is preferably cylindrical, and the heads 2 and 3 are usually dome-shaped and provided with flanges to inclose the cylindrical portion of the vessel, the union between the heads and the cylinder usually being effected by rivets and by brazing or solder.

The hot-water pipe A and cold-water pipes B B' are provided with suitable faucets, and they are connected to the vessel C so that the hot-water pipe A opens near one end of such vessel and the cold-water pipes B B' open near the other end of such vessel C. I prefer to place the vessel C vertical, so that the hot water comes in near the bottom and the cold water near the top.

The delivery-pipe D is preferably central to the vessel C, and it is perforated with numerous comparatively small holes. It may pass into the vessel C from either end; but I have represented this pipe D as provided with a flange 4, setting against the lower head 3 and screwing into a nut 5 against the upper head 2, so that the delivery-pipe D strengthens the vessel by tying the two heads together and lessening the risk of the heads blowing off under the heavy pressure to which vessels of this character are often subjected.

The pipe E leads up to a shower F from the upper end of the mixing vessel, and for the use of barbers and others a pipe is advantageously extended from the lower end of the delivery-pipe D and provided with a cock 6 and flexible tube to a rose or spray L for shampooing, and a thermometer H is usually provided with the bulb within the mixing-chamber.

It will now be understood that cold water passing by the pipes B B' enters the upper part of the vessel C, and the hot water enters the bottom part of such vessel by the pipe A, and the hot water being the lightest tends to rise in the vessel and the cold water to sink. Hence there is a mixture of the two and the perforations in the delivery-pipe being numerous and small the water is drawn from all parts of the mixing vessel and an average temperature is obtained regardless of whether the hot and cold water are thoroughly mixed or not, and thereby prevent the volume of water being taken at any one place and the temperature of the water as discharged is reliably regulated.

It is to be understood that the cock or valve 7 to the shower will be opened and the temperature determined by the thermometer by regulating the hot and cold water faucets before using either the shower F or the rose or spray L, and by the present construction the one delivery-pipe serves for the two purposes and the apparatus takes but little space, and while especially adapted for shower and shampoo this mixing vessel may be used with other connections for baths or basins.

One end of the pipe D is to be stopped or closed in any desired manner where but one connection is made to the same for a shower, shampoo, bidet, bath, or basin.

I claim as my invention—

1. The combination with a vessel and pipes for supplying hot and cold liquids into such vessel, of a discharge-pipe extending within such vessel and perforated with numerous small holes all around it and along its length so as to draw the liquid through such perforations only and from all parts of the mixing vessel and thereby obtain an average temperature, substantially as set forth.

2. The combination with a vessel forming a mixing-chamber for liquids of different temperatures, of a pipe for supplying the warmer liquid opening into the lower part of such vessel and a pipe for supplying the colder liquid opening into the upper part of such vessel, and a discharge extending along within such vessel and having numerous small perforations for insuring a proper mixture of the liquids as they are drawn off, substantially as set forth.

3. A mixing vessel having a head at each end in combination with a delivery-pipe passing through the vessel and connected to the two heads for strengthening the vessel, such delivery-pipe having numerous small perforations, a pipe for supplying warmer liquid opening into the lower part of such vessel and a pipe for supplying the colder liquid opening into the upper part of such vessel, substantially as set forth.

4. The combination with a vessel forming a mixing-chamber, of a delivery-pipe passing through such vessel and having numerous small perforations for the liquid passing into such pipe, a supply-pipe for the cold liquid passing up into such vessel and opening near the upper end thereof, and a supply-pipe for the warmer liquid opening into the lower part of such vessel, substantially as set forth.

Signed by me this 21st day of October, 1895.

L. M. HOOPER.

Witnesses:
DANL. C. MEYER,
EDWARD HAMMANN.